(No Model.)
F. ARMSTRONG.
TAP WRENCH.
No. 268,978.　　　　　　　　Patented Dec. 12, 1882.
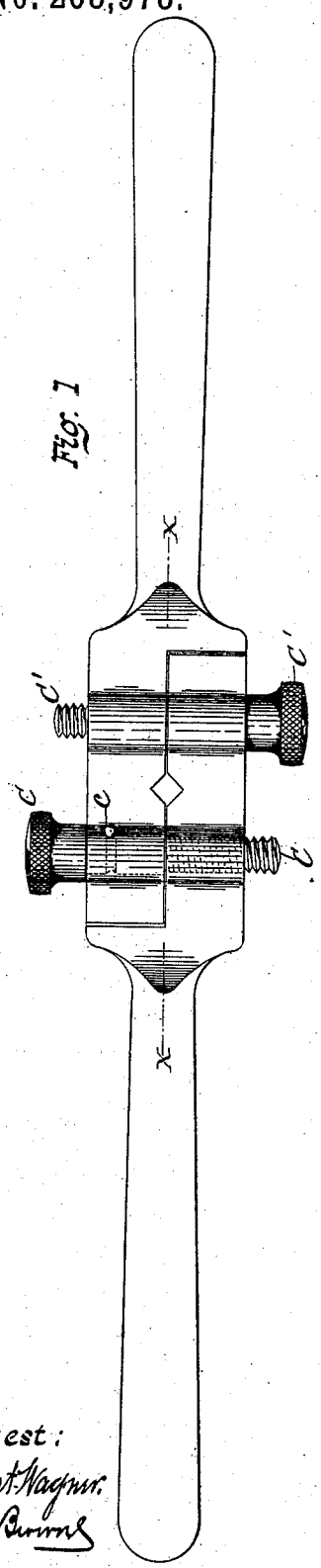
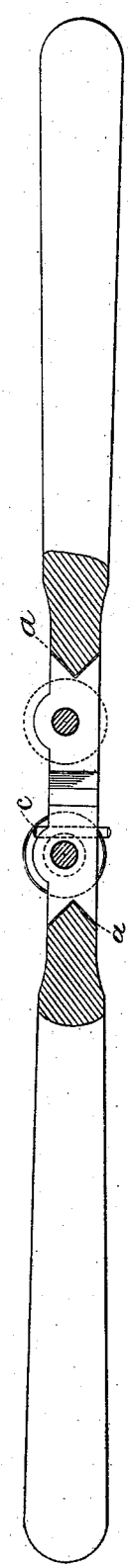
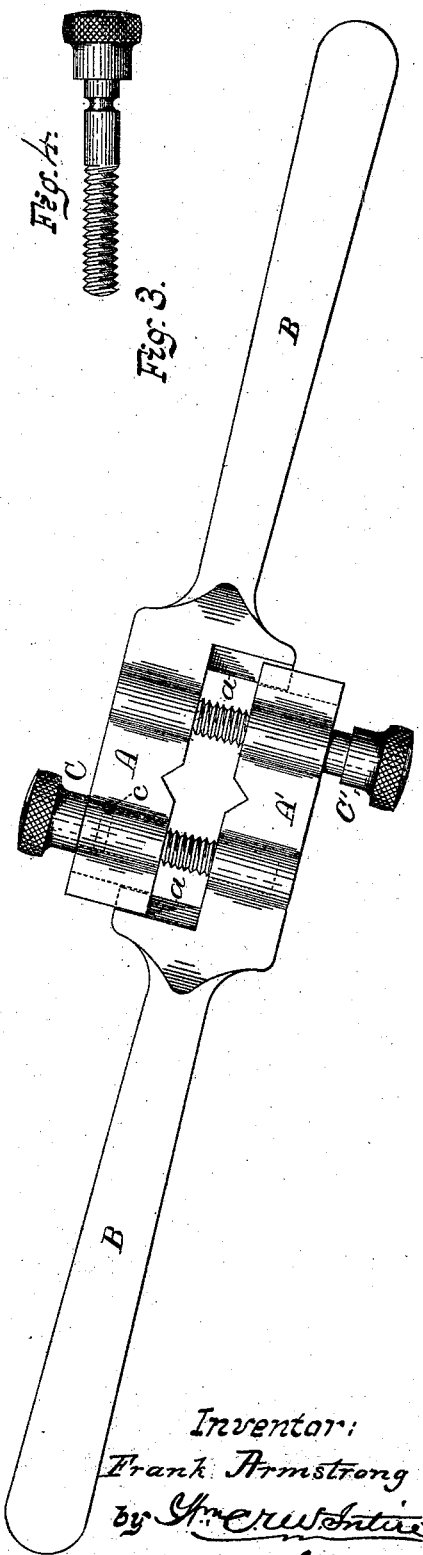
Attest:
Inventor:
Frank Armstrong
by　Attorney

UNITED STATES PATENT OFFICE.

FRANK ARMSTRONG, OF BRIDGEPORT, CONNECTICUT.

TAP-WRENCH.

SPECIFICATION forming part of Letters Patent No. 268,978, dated December 12, 1882.

Application filed October 3, 1882. (No model.)

*To all whom it may concern:*

Be it known that I, FRANK ARMSTRONG, a citizen of the United States, residing at Bridgeport, Fairfield county, Connecticut, have invented new and useful Improvements in Tap-Wrenches, of which the following is a specification.

My invention relates to certain new and useful improvements in tap-wrenches; and it consists in the peculiar construction and arrangement of the parts, as will be hereinafter fully described and specifically claimed.

In order that those skilled in the art to which my invention relates may know how to make and use the same, I will proceed to describe its construction and operation, referring to the accompanying drawings, in which—

Figure 1 is a plan view of a tap-wrench embodying my invention. Fig. 2 is a longitudinal section taken at line $x\ x$ of Fig. 1. Fig. 3 is a view similar to Fig. 1, with the jaws separated; and Fig. 4 is a detail view of one of the screws used for causing movement of the jaws.

Similar letters indicate like parts in the several figures.

A A' represent the jaws for grasping the head of the tap, each jaw having formed integral therewith a handle, B, with which to operate the device. The jaws are guided at the heel and toe, as clearly shown in Figs. 2 and 3, by male and female V-shaped ways $a$, and the movement to and from each other for the purposes of adjustment is produced by a screw, C, having a milled head. This screw has its rear portion unthreaded, and passes through the toe end of the jaw A, and the front end of the screw, being threaded, works in a female thread in the heel end of the jaw A'. As seen at Fig. 4, the screw C is formed with an annular groove, $b$, through which and the jaw A a pin, $c$, passes, so that the movement of the threaded end of the screw within the female thread in jaw A', as before stated, causes the two jaws A and A' to approach or recede from each other, according to the direction given to the movement of the screw, the jaws being kept in parallelism by the V-shaped guides $a$. C' is another screw, similar to C, but arranged with reference to the two jaws just the reverse of the screw C, and divested of the pin $c$. The screw C' is of course loosened or unscrewed before the other screw C in the operation of opening or expanding the jaws, and in closing the jaws they are operated in the reverse order. The screw C' is used to give additional strength to the device and induce to a firmer grasp than could be secured by the use of the screw C only, while as a matter of fact the actual adjustment of the parts is accomplished by the screw C only. I prefer to use both screws; but it is obvious that by reason of the V-shaped guides the screw C only may be used with success.

I am aware that pipe-wrenches have been made in which two independent jaws are adjusted by screw-threads on the ends of two independent handles, as shown and described in Letters Patent No. 188,978; but it will be observed that the construction and operation of my wrench are essentially different. In my wrench the screw C cannot be turned without moving the jaws A A' toward or from each other, while in the structures referred to the screw-handles may both be unscrewed without separating the jaws; and the two devices differ generally.

What I claim as new, and desire to secure by Letters Patent, is—

1. In a tap-wrench, the jaws A A', formed with a heel and toe, as described, ways $a$, handles B, and adapted to be secured in operative position by a screw, C, substantially as described.

2. In combination with the jaws A A', having guides $a$, and handles B, and secured in operative relation by a screw, C, the auxiliary screw C', substantially as and for the purpose set forth.

In testimony whereof I have hereunto set my hand in the presence of two subscribing witnesses.

FRANK ARMSTRONG.

Witnesses:
T. M. PALMER, Jr.,
H. E. BOWSER.